United States Patent
Autenrieth et al.

[11] Patent Number: 5,928,614
[45] Date of Patent: Jul. 27, 1999

[54] REFORMING REACTOR, PARTICULARLY FOR THE WATER VAPOR REFORMING OF METHANOL

[75] Inventors: Rainer Autenrieth, Erbach; Dietmar Heil, Schwendi, both of Germany

[73] Assignee: Daimler Benz AG, Germany

[21] Appl. No.: 08/879,032

[22] Filed: Jun. 19, 1997

[30] Foreign Application Priority Data

Jun. 19, 1997 [DE] Germany .......................... 196 24 435

[51] Int. Cl.⁶ .................................................... B01J 8/06
[52] U.S. Cl. .......................... 422/211; 422/171; 422/177
[58] Field of Search .................................... 422/171, 177, 422/211

[56] References Cited

U.S. PATENT DOCUMENTS

| | | |
|---|---|---|
| 3,522,019 | 7/1970 | Buswell et al. |
| 5,213,770 | 5/1993 | Noyes ........................................ 422/211 |
| 5,248,566 | 9/1993 | Kumar et al. .............................. 429/19 |
| 5,401,589 | 3/1995 | Palmer et al. ............................. 429/13 |

Primary Examiner—Timothy McMahon
Attorney, Agent, or Firm—Evenson, McKeown, Edwards & Lenahan, P.L.L.C.

[57] ABSTRACT

A reforming reactor has three serially arranged reactors stages, each of which is charged with a catalyst material. A heating device is assigned only to the center reactor stage, and the inlet-side reactor stage has a heat exchange connection with the outlet-side reactor stage.

7 Claims, 2 Drawing Sheets

REFORMING REACTOR, PARTICULARLY FOR THE WATER VAPOR REFORMING OF METHANOL

This application claims the priority of German patent application 196 24 435.8, the disclosure of which is expressly incorporated by reference herein.

BACKGROUND AND SUMMARY OF THE INVENTION

The invention relates to a reforming reactor for the water vapor reforming of methanol, such as may be used, for example, to produce hydrogen in fuel-cell-operated vehicles.

U.S. Pat. No. 5,248,566 describes a reforming reactor suitable for use in fuel-cell-operated motor vehicles. It has three serially arranged reactors stages, each of which is charged with a suitable reforming catalyst material. The inlet-side reactor stage is charged with a suitable catalyst material for the partial oxidation of methanol, while the center reactor stage is charged with another suitable catalyst material for water vapor reforming of methanol. The outlet-side reactor stage is designed to implement a conversion reaction from carbon monoxide to carbon dioxide. The heat required for carrying out the endothermal water vapor reforming reaction in the center reactor stage is generated by the exothermal partial methanol oxidation in the inlet-side reactor stage, and is transferred to the center reactor stage by the flow of reaction gas.

U.S. Pat. No. 5,401,589 discloses a three-stage reforming reactor for water vapor reforming of methanol, which includes a reaction space filled with a catalyst pellet fill, and is divided into three reactor stages which are situated below one another and are held at different temperatures. The inlet-side stage is maintained at approximately 300° C.; the center stage is maintained at approximately 275° C. and the outlet-side stage is maintained at approximately 225° C. The heating of the three reactor stages takes place by way of a heat-conducting dividing wall through which these reactor stages with different contact surfaces are in a thermal contact with a common heating space.

U.S. Pat. No. 3,522,019 discloses a reforming reactor of the initially mentioned type in which three separate reaction spaces are filled with a catalyst material, with an external heating device in the form of a burner being assigned only to the center stage. The inlet-side reactor stage can be heated via an internal heat exchanger and the hot reaction gas which comes out of the center stage, and for this purpose is guided in a counterflow through the heat exchanger. The heat generated in the third reactor stage is coupled into a connected hydrogen purification unit.

The object of the invention to provide a new reforming reactor of the initially mentioned type, which can be implemented at relatively low expenditures and is particularly suitable for mobile applications.

This and other objects and advantages are achieved by the reactor according to the invention, in which the inlet-side reactor stage, which is supplied with heat from the outlet-side reactor stage, can convert a small portion of the hot entering gas mixture, reducing the concentration of the gas constituents that are to be reformed, at the start of the center reactor stage. This permits a smaller construction of the center stage and its slower aging as the result of the gas constituents to be reacted. At the same time, as a result of its catalyst material charge (preferably in the form of a catalyst pellet fill), the inlet side reactor stage is capable of filtering out floating particles, so that a hot gas filter in front of the center reactor stage becomes unnecessary. In addition, water and methanol drops can be filtered out by the inlet-side reactor stage, preventing resultant damage to the catalyst material in the center reactor stage, which is important for the implementation of the reforming reaction. It is unnecessary, therefore, for the educt gas flow to be free from drops for this purpose; this feature, in turn, permits a simpler construction of an evaporator connected in front of the first reactor stage. By means of a corresponding heating, the main reforming reaction takes place in the center reactor stage in the temperature range optimal for this purpose.

Because it is unnecessary to heat the third reactor stage, a conversion reaction can take place here, by which the carbon monoxide is converted to carbon dioxide, so that the carbon monoxide fraction in the reaction gas can be reduced. Moreover, because of the heating capacity of the outlet-side reactor stage, temperature fluctuations in the center reactor stage, such as occur during load changes, are damped so that, while the construction is small, the center reactor stage can be operated at higher temperatures and larger temperature fluctuations. In addition to fluctuations of the gas outlet temperature, as a result of the outlet-side reactor stage, fluctuations of the carbon monoxide content in the reaction gas during load changes are also reduced. By means of the thermal coupling of the inlet-side with the outlet-side reactor stage, a self-regulating heat transmission mechanism is implemented during load changes, in which case the lower inlet and outlet temperatures of the gas mixture permit a higher efficiency.

The inlet-side and the outlet-side reactor stages may be connected with one another in a heat exchange connection by way of a heat conducting dividing wall. Alternatively, they are spatially separated from one another and heat exchange is performed by the reaction gas flow emerging from the outlet-side reactor stage, which is guided through a tempering space that is in thermal contact with the inlet-side reactor stage.

In one embodiment of the invention, the inlet and outlet side reactor stages together form an independent heat exchanger unit which is spatially separated from the center reactor stage. Thus, for example, a single-stage reforming reactor can be upgraded to a three-stage reforming reactor by means of a simple retrofitting with such a heat exchanger unit.

Other objects, advantages and novel features of the present invention will become apparent from the following detailed description of the invention when considered in conjunction with the accompanying drawings.

DETAILED DESCRIPTION OF THE DRAWINGS

The reforming reactors (which are illustrated schematically in the figures, showing only the construction of portions which are of interest here) are suitable, for example, for a use in a fuel-cell-operated motor vehicle, to produce hydrogen for the feeding of the fuel cells by water vapor reforming of methanol. All illustrated reactors have in common that they contain three serially arranged reactor stages, with the inlet-side stage being connected via a heat exchanger with the outlet-side stage and no external heating device being assigned to these two stages. On the other hand, external heat is provided for the center reactor stage. All three reactor stages are charged with the same catalyst material (preferably in the form of a catalyst pellet fill), which is selected according to the reforming reaction to be carried out. For water vapor reforming of methanol, a $CuO/ZnO/Al_2O_3$ catalyst material is suitable, for example.

Figure 1:
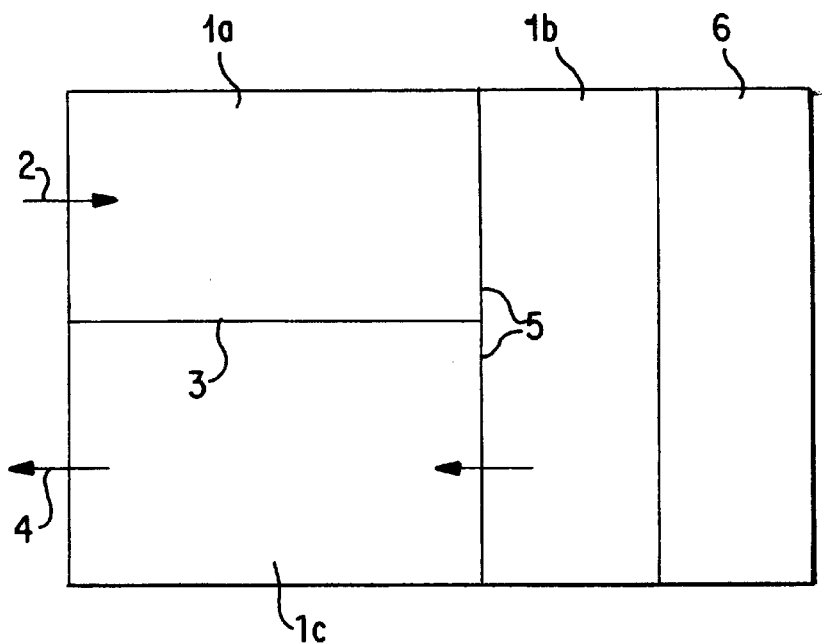
FIG. 1 is a block-diagram which shows a three-stage reforming reactor with adjoining reactor stages.

In the reforming reactor illustrated in FIG. 1, the gas mixture 2 to be reacted enters the inlet-side reactor stage 1a as the educt gas flow. A highly heat conducting, gas-tight dividing wall 3 provides thermal contact between the inlet side reactor stage 1a and the adjoining, outlet-side side reactor stage 1c from which the reaction gas 4 emerges. Separated by a lateral, gas-permeable dividing wall 5, the center reaction stage 1b adjoins both the output of the inlet-side reactor stage 1a and the input of the outlet-side reactor stage 1c, so that the gas flow is deflected in a U-shape in the center reactor stage 1b. A heating device 6 adjoins the side of the center reactor stage 1c which is opposite the complex consisting of the inlet and outlet-side reactor stages 1a, 1c, and maintains the center reactor stage 1b at an elevated temperature (280–350° C. in the example given below) which is optimal for implementing the desired reforming reaction.

In the water vapor reforming of methanol, the reforming reactor constructed in this manner operates as follows. A low proportion of the methanol/water vapor mixture 2 entering into the inlet-side reactor stage 1a is reformed therein, utilizing heat supplied from the outlet-side reactor stage 1c by way of the dividing wall 3. The inlet-side reactor stage 1a simultaneously filters floating particles, such as water and methanol drops, preventing them from the entering gas mixture 2. Thus, no hot gas filter is required in front of the center reaction stage 1b, and the catalyst material therein is not subject to noticeable damage or aging of its catalytic characteristic. This also simplifies the construction of an evaporator connected in front of the inlet-side reactor stage 1a, because the evaporator does not have to be designed to eliminate drops in the educt gas flow.

The partially converted gas mixture then passes through the gas-permeable dividing wall 5, and enters into the center reactor stage 1b, where the main reforming reaction takes place. For this purpose, the center reactor stage is maintained at a suitable temperature of between 280° C. and 350° C. by the heating device 6. The reaction gas obtained by the latter reforming reaction then passes once again through the gas-permeable dividing wall 5 to the outlet-side reactor stage 1c whose temperature is below 280° C. (because of a lack of exterior heating), thus permitting a conversion reaction in which carbon monoxide can at least partially be converted to carbon dioxide. In this manner, a hydrogen-rich reaction gas with a very low carbon monoxide concentration is obtained at the output of the outlet-side reactor stage 1c.

The heat released during the exothermal conversion reaction is transmitted to the inlet-side reactor stage 1a by way of the heat conducting, gas-tight dividing wall 3. In addition, the heat capacity of the third reactor stage 1c dampens temperature fluctuations in the center reactor stage 1b which may occur during load changes that are possible, for example, in a use in motor vehicles during the driving operation. While the construction of the outlet-side rector stage is comparatively small, the CO conversion performed there permits the center reactor stage 1b to be operated at higher temperatures, with larger temperature fluctuations. The outlet-side reactor stage 1c ensures that the fluctuations of the CO-concentration and of the gas output temperature remain very low during load changes.

The thermal contact between the inlet-side 1a and the outlet-side reactor stage 1c by way of the highly heat conducting dividing wall 3 provides a heat transfer mechanism which is self-regulating during load changes, and the relatively low gas inlet and gas outlet temperatures result in a comparatively high efficiency of the reactor. On the whole, a simple and compact reforming reactor is obtained, which is highly insensitive to temperature fluctuations during load changes, and has a higher energetic efficiency.

If the reactor is positioned so that the inlet-side reactor stage 1a and/or the outlet-side reactor stage 1c are above the center reactor stage 1b, in addition, an automatic fill-up function with catalyst material can be implemented for the center reactor stage 1b. This is expedient, for example, for use in a motor vehicle where, as a result of shaking during the driving operation, settling of the catalyst pellet fill may occur. For this purpose, the gas-permeable dividing wall 5 must then only be designed such that catalyst pellets can also pass through under the effect of gravity. In the case of occurring settling phenomena in the center reaction stage 1b, the catalyst material can then automatically slide from the inlet-side reactor stage 1a and/or the outlet-side reactor stage 1c into the center reactor stage 1b.

Figure 2:
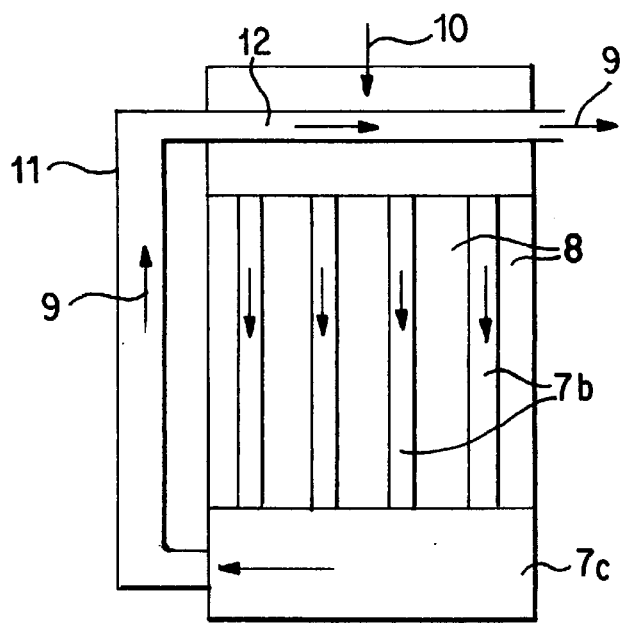
FIG. 2 is a block-diagram which shows a three-stage reforming reactor with an outlet-side reactor stage that is spatially separated from the inlet-side reactor stage.

The reforming reactor illustrated in FIG. 2 differs from that of FIG. 1 mainly by a spatial separation of the inlet-side reactor stage 7a and the outlet-side reactor stage 7c. Between the inlet-side reactor stage 7a and the outlet-side reactor stage 7c (both implemented as one-piece, catalyst-charged spaces), a reactor tube bundle consisting of several catalyst-charged reactor tubes is situated as the center reactor stage 7b. For heating this center reactor stage 7b, the reactor tubes traverse a heating space 8 which is enclosed by the inlet-side reactor stage 7a and the outlet-side reactor stage 7c as well as by lateral housing walls. A heating fluid of a suitable temperature flows through the heating space 8 to maintain the temperature in the reaction tubes in the temperature range suitable for carrying out the reforming reaction. As indicated, when the reactor is operated by means of essentially vertically extending reaction tubes, an automatic catalyst refilling function is obtained; that is, if the catalyst fill settles, catalyst material can slide from the upper, inlet-side reactor stage 7a into the tubes of the reactor tube bundle 7b.

The heat exchange connection between the inlet-side 7a and the outlet-side reactor stage 7c is provided by the reaction gas flow 9 emerging from the outlet-side reactor stage 7c via a pertaining feed line 11 into a tempering space 12 which is in a thermal contact with the first reactor stage 7a. In the illustrated embodiment, this tempering space 12 consists simply of one tube; alternatively, however, it may have several tubes guided transversely through the inlet-side reactor stage 7a. The reaction gas 9 is obtainable at the outlet of the tubes.

This reactor for producing a high-hydrogen, low-carbon-monoxide reaction gas 9 from the entering gas mixture 10 by water vapor reforming of methanol at a lower fraction in the inlet-side reactor stage 7a and for the main part in the center reactor stage 7b, operates in a manner which corresponds to that of the reactor of FIG. 1, to which reference can be made. Only the manner of transmitting of the heat generated by the CO conversion reaction in the outlet-side reactor stage 7c to the inlet-side reactor stage 7a differs, in that the reaction gas 9 from the output of the outlet-side reactor stage 7c is guided through the inlet-side reactor stage 7a.

Figure 3:
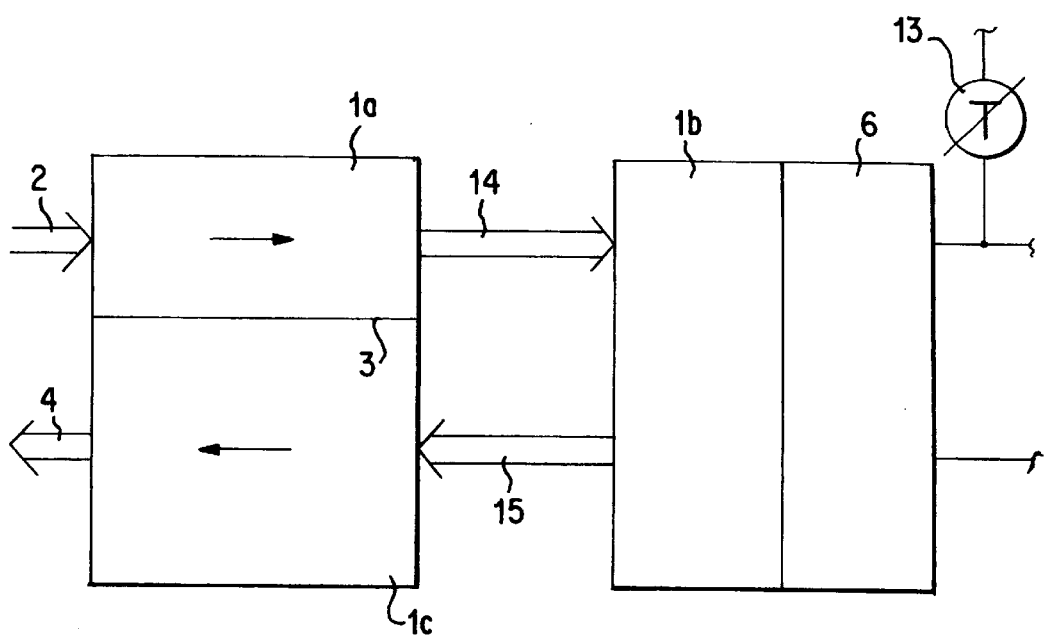
FIG. 3 is a block-diagram which shows a three-stage reforming reactor having a heat exchanger unit which is separated from the center reactor stage and contains the inlet and outlet reactor stages.

The construction and operation of the reforming reactor illustrated in FIG. 3 corresponds essentially to that of FIG. 1, and functionally equivalent components have the same reference numbers. In contrast to the reactor of FIG. 1, however, in the reactor of FIG. 3, the center reactor stage 1b does not connect directly by way of a dividing wall to the inlet-side reactor stage 1a and the outlet-side reactor stage 1b; rather, it is spatially separated from them. In this case, a first gas connection line 14 leads from the output of the inlet-side reactor stage 1a to the input of the center reactor stage 1b, and a second gas connection line 15 extends from the output of the center reactor stage 1b to the input of the outlet-side reactor stage 1c. The heating device 6, which contains a temperature control element 13 (controlled by a heater control system, not shown), is in turn coupled to the center reactor stage 1b.

The inlet-side reactor stage 1a and the outlet-side reactor stage 1c adjoin one another, and are separated by a highly heat conducting, gas-tight dividing wall 3. In this manner, these stages form a heat transfer unit which is spatially separated from the center reactor stage 1b. This spatial uncoupling of the inlet-side and outlet-side reactor stages 1a, 1c from the center reactor stage 1b (which carries out the main reforming reaction and can be externally heated for this purpose) permits a simple retrofit of single-stage reforming reactors. The existing reactor will then be used as the center reactor stage 1b, to which is then connected an additional reformer (the heat transfer unit) consisting of the inlet-side 1a and outlet-side reactor unit 1c, by way of the gas connection lines lines 14, 15. This additional reformer component is a passive structural element, without regulating and heating components to be connected, which makes a retrofitting particularly simple. In addition, the method of operation of this reactor corresponds completely to that of the reactor of FIG. 1.

It is understood that the reforming reactors according to the invention, as those of the described examples, can be used not only for the water vapor reforming of methanol but also for implementing any reforming reaction in which the reforming is carried out by means of three reactor stages of which only the center stage is heated externally while the two other stages are connected with one another by a heat exchanger.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A reforming reactor comprising:

three serially arranged reactor stages comprising an inlet side reactor stage, a center reactor stage and an outlet side reactor stage, wherein the reaction in at least one of said inlet side and outlet side reactor stages is an exothermic reaction, each of said reactor stages being charged with a catalyst material;

a heating device coupled in thermal communication only with said center reactor stage of said three serially arranged reactor stages; and a heat exchange connection between said inlet side reactor stage and said outlet-side reactor stage of said three serially arranged reactor stages.

2. A reforming reactor according to claim 1 wherein said heat exchange connection comprises a heat conducting dividing wall which separates said inlet side reactor stage and said outlet side reactor stage.

3. A reforming reactor according to claim 1 wherein said inlet side reactor stage and said outlet side reactor stage are spatially separated from each other, and said heat exchange connection is provided by a reaction gas flow from said outlet side reactor stage, through a tempering space which is in thermal contact with said outlet side reactor stage.

4. A reforming reactor according to claim 1 wherein said reforming reactor comprises a reforming reactor for water vapor reforming of methanol.

5. Reforming reactor according to claim 1 wherein the inlet-side reactor stage and the outlet-side reactor stage together form an independent heat transfer unit spatially separated from the center reactor stage.

6. Reforming reactor according to claim 2 wherein the inlet-side reactor stage and the outlet-side reactor stage together form an independent heat transfer unit spatially separated from the center reactor stage.

7. Reforming reactor according to claim 4 wherein the inlet-side reactor stage and the outlet-side reactor stage together form an independent heat transfer unit spatially separated from the center reactor stage.

* * * * *